US009965571B2

(12) United States Patent
Hield et al.

(10) Patent No.: US 9,965,571 B2
(45) Date of Patent: May 8, 2018

(54) AEROFOIL RECAMBERING

(71) Applicant: ROLLS-ROYCE PLC, London (GB)

(72) Inventors: Paul Hield, Bristol (GB); James Page, St Ives (GB); Paul Tucker, Fen Drayton (GB)

(73) Assignee: ROLLS-ROYCE plc, London (GB)

( * ) Notice: Subject to any disclaimer, the term of this patent is extended or adjusted under 35 U.S.C. 154(b) by 1044 days.

(21) Appl. No.: 14/265,843

(22) Filed: Apr. 30, 2014

(65) Prior Publication Data
US 2014/0348648 A1 Nov. 27, 2014

(30) Foreign Application Priority Data

May 23, 2013 (GB) .................................. 1309280.4

(51) Int. Cl.
*G06F 17/50* (2006.01)
*F01D 5/14* (2006.01)
*F01D 9/02* (2006.01)

(52) U.S. Cl.
CPC ............ *G06F 17/50* (2013.01); *F01D 5/141* (2013.01); *F01D 9/02* (2013.01); *G06F 17/5018* (2013.01); *F05D 2260/81* (2013.01); *G06F 2217/46* (2013.01); *Y02T 50/673* (2013.01)

(58) Field of Classification Search
CPC ........ F01D 5/141; F01D 9/02; F05D 2260/81; G06F 17/50; G06F 17/5018; G06F 2217/46; Y02T 50/673
USPC ............................................................. 703/1
See application file for complete search history.

(56) References Cited

U.S. PATENT DOCUMENTS

| 8,419,373 | B1 * | 4/2013 | Fukami | ................. | F03D 1/0633 |
| | | | | | 415/4.3 |
| 2011/0163205 | A1 * | 7/2011 | Shepshelovich | .......... | B64C 3/14 |
| | | | | | 244/219 |
| 2011/0182741 | A1 * | 7/2011 | Alexander | .............. | F01D 5/148 |
| | | | | | 416/229 R |

FOREIGN PATENT DOCUMENTS

| CN | 103047079 A1 | 4/2013 |
| EP | 1 742 160 A1 | 1/2007 |

OTHER PUBLICATIONS

Larosiliere, Louis M., Jerry R. Wood, Michael D. Hathaway, Adam J. Medd, and Thong Q. Dang. "Aerodynamic design study of advanced multistage axial compressor." (2002).*
Biollo, Roberto. "Systematic investigation on swept and leaned transonic compressor rotor blades." (2008).*
Search Report issued in British Application No. 1309280.4 dated Dec. 3, 2013.
Sep. 30, 2014 Search Report issued in European Application No. 14 16 6295.

(Continued)

*Primary Examiner* — Aniss Chad
(74) *Attorney, Agent, or Firm* — Oliff PLC

(57) ABSTRACT

A method of recambering an aerofoil section. A position on one of the surfaces that intersects with a passage shock between adjacent aerofoils is determined and then projected as a shock position onto the camber line. A shock region encompassing the shock position and extending in a chordal direction towards the leading and trailing edges is defined. The camber line is recalculated in an upstream region using semi-inverse design. The camber line is extrapolated across the shock region to match a geometric criterion. The camber line is recalculated in a downstream region using semi-inverse design.

16 Claims, 4 Drawing Sheets

(56) References Cited

OTHER PUBLICATIONS

Jinguang Yang Et Al. "The Development and application of an inviscid inverse method". Propulsion and Power Research. vol. 2,No. 2, pp. 131-138, May 22, 2013, XP055143472.
Raja Ramamurthy Et Al. "A Viscous Inverse Design Method for Internal and External Flow Over AIRFOIS Using CFD Techniques". V European Conference on Computational Fluid Dynamics ECCOMAS CFD 2010. pp. 14-17, Jun. 17, 2010, XP055143477.

\* cited by examiner

1

AEROFOIL RECAMBERING

The present invention relates to a method of recambering an aerofoil section forming part of an aerofoil. It finds particular utility for recambering an aerofoil that is subject to passage shock.

It is known to recamber an aerofoil in order to refine an earlier aerofoil shape. A known method includes semi-inverse design in which the pressure loading between the pressure and suction surfaces of the aerofoil is compared to a target pressure loading. The camber line is then changed to improve the match between the calculated and target pressure loading. The thickness between the pressure surface and camber line, and between the suction surface and camber line, is maintained.

A disadvantage of this method is that passage shocks between aerofoils cause discontinuities in the calculated pressure loading across an aerofoil. The target pressure distribution cannot be accurately defined in advance to take account of the aerodynamic effects of such passage shocks. Consequently the semi-inverse design method often designs a suboptimal feature, such as a kink, into the camber line of the aerofoil at the approximate location of the passage shock.

The present invention provides a method of recambering an aerofoil section that seeks to address the aforementioned problems.

Accordingly the present invention provides a method of recambering an aerofoil section wherein the aerofoil section is one of a spanwise array forming an aerofoil; the aerofoil section having a leading edge, a trailing edge, a suction surface, a pressure surface, and a camber line equidistant from the suction and pressure surfaces and having an upstream end and a downstream end. The method comprising steps to:
  a) determine a position on one of the pressure surface and the suction surface that intersects with a passage shock between adjacent aerofoils;
  b) project the shock position onto the camber line;
  c) define a shock region encompassing the shock position and extending in a chordal direction towards the leading and trailing edges;
  d) recalculate the position of the camber line in an upstream region between the shock region and the upstream end of the camber line to match calculated pressure loading between the suction and pressure surfaces to a first target pressure loading distribution;
  e) project the camber line across the shock region to match a geometric criterion; and
  f) recalculate the position of the camber line in a downstream region between the shock region and the downstream end of the camber line to match calculated pressure loading between the suction and pressure surfaces to a second target pressure loading distribution.

The method therefore includes a feedback loop to take account of the actual position of the passage shock and then sets the target pressure loading distribution accordingly. Advantageously, the method recambers an aerofoil section without kinks or other discontinuities caused by the passage shock effect on the pressure loading.

The shock region may extend by 2-5% of chordal length towards the leading edge. The shock region may extend by 2-5% of chordal length towards the trailing edge. The shock region may extend by about 3% of chordal length towards the leading edge. The shock region may extend by about 3% of chordal length towards the trailing edge. Advantageously, the shock region is wide enough to fully encompass the projected passage shock, which is spread by computational fluid dynamics analysis, whilst not comprising a significant proportion of the chord length.

The camber line may be discretised. Advantageously this offers short line portions on which to perform the recalculation steps.

The recalculating steps may comprise applying an inverse design method, particularly a semi-inverse design method. Advantageously this enables the recambering method to be applied in conjunction with an aerofoil section thickness constraint.

The geometric criterion may be one of the group comprising: linear; quadratic; polynomial; exponential; conic section fit; B-spline. Beneficially, the camber line can be extrapolated or projected across the shock region in any desirable shape. The geometric criterion may be described by any analytic function or in another suitable way.

The position of the camber line at the end of the projection step is used to calculate a recamber angle for use in the second recalculation step. The recamber angle may be proportional to the difference between calculated and target pressure loading and inversely proportional to the sum of the pressures on the pressure and suction surface. The constant of proportionality may be a multiple of the aerofoil section stiffness. There may be an additional step before the second recalculation step to scale the second target pressure loading distribution using the calculated pressure loading at a downstream edge of the shock region. Advantageously, this prevents kinks or other discontinuities being included in the new camber line.

The first step of the method may comprise determining the position of each of the pressure and suction surfaces that intersects with the passage shock. The second step may comprise projecting each intersection point onto the camber line to be shock positions. The third step may comprise defining a shock region encompassing each shock position. The shock regions may overlap or be distinct. If the shock regions are distinct, there are three camber line regions and steps e) and f) are repeated for each shock region and camber line portion downstream thereof. Advantageously the method can recamber an aerofoil section that experiences pressure discontinuities on both its pressure and suction sides.

The method may comprise applying computational fluid dynamics to calculate the calculated pressure loading.

The method may further comprise a step to recalculate the position of the suction surface and the pressure surface from the recalculated camber line. The steps of the method may be iterated. The steps may be iterated until the calculated pressure loading matches the target pressure loading within a predetermined tolerance. The method is likely to converge to a stable recambered aerofoil section.

The steps of the method may be iterated for each aerofoil section in the array forming the aerofoil to produce a recambered aerofoil design. The method may comprise a further step to manufacture a recambered aerofoil according to the recambered aerofoil design. Advantageously such an aerofoil will be aerodynamically smooth and therefore more efficient than the base aerofoil design which was recambered.

The present invention provides a rotor assembly comprising a recambered aerofoil designed according to the described method. It also provides a stator assembly comprising a recambered aerofoil designed according to the described method. Further it provides a gas turbine engine comprising a recambered aerofoil designed according to the described method.

The present invention provides a computer program having instructions adapted to carry out the methods described; a computer readable medium, having a computer program recorded thereon, wherein the computer program is adapted to make the computer execute the methods described; and a computer program comprising the computer readable medium as described.

Any combination of the optional features is encompassed within the scope of the invention except where mutually exclusive.

The present invention will be more fully described by way of example with reference to the accompanying drawings, in which.

Figure 1:
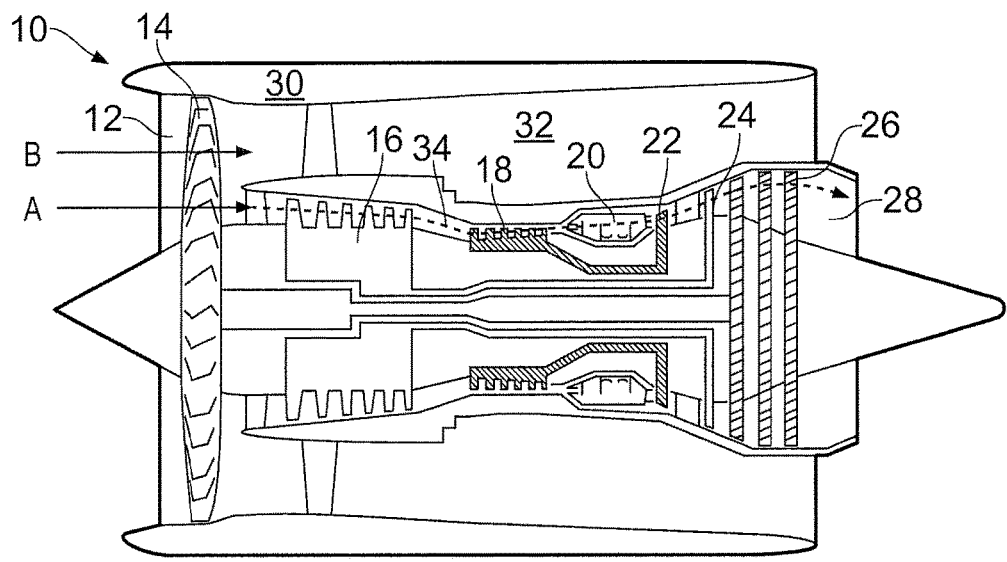
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28; these components comprising the engine core. A nacelle 30 surrounds the gas turbine engine 10 and defines, in axial flow B, a bypass duct 32. Streamlines are the flow lines through the engine 10, which are substantially axial with a radial component caused by the change in radial dimension of the core. For clarity, only one of the streamlines 34, which may be an approximate streamline 34, is illustrated through the core.

Figure 2:
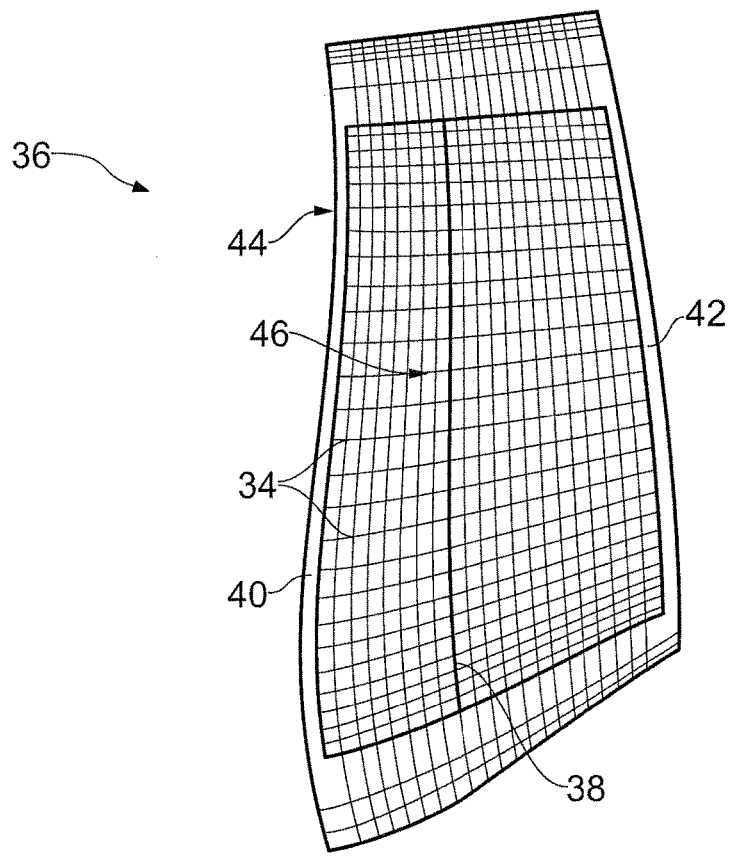
FIG. 2 is a perspective view of an exemplary aerofoil to which the method of the present invention is applied.

An exemplary aerofoil 36 is shown in FIG. 2. The aerofoil 36 may be, for example, a fan blade from the fan 14; a rotor blade from a stage of one of the compressors 16, 18 or turbines 22, 24, 26; or a stator blade from a stage of one of the compressors 16, 18 or turbines 22, 24, 26. Superimposed on the aerofoil 36 are a plurality of streamlines 34 and the stacking axis 38. The stacking axis 38 is a spanwise line, that is extending from hub to tip of the aerofoil 36 and following its shape. The position of the stacking axis 38 is a predefined fraction of the aerofoil chord.

The aerofoil 36 comprises a leading edge 40 and a trailing edge 42 which are oriented towards the upstream and downstream directions respectively when the aerofoil 36 is mounted and in use in a gas turbine engine 10. The suction surface 46 of the aerofoil 36 is visible in FIG. 2 whilst the pressure surface 44 is indicated behind the suction surface 46. The pressure and suction surfaces 44, 46 each form a surface of the aerofoil 36 and extend between the leading and trailing edges 40, 42. The chord of the aerofoil 36 is the straight line between the leading and trailing edges 40, 42.

Figure 3:
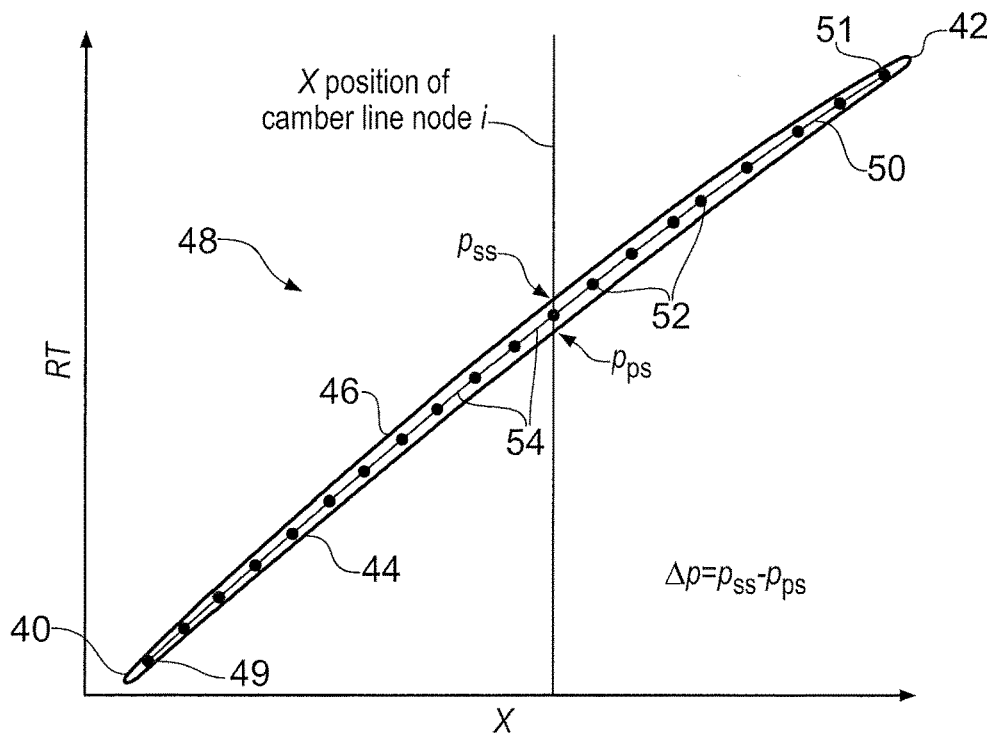
FIG. 3 is an aerofoil section having a discretised camber line.

An aerofoil section 48 is shown in FIG. 3 plotted in the axial-circumferential plane. The aerofoil section 48 is a two-dimensional section through the aerofoil 36 along a streamline 34. Bisecting the aerofoil section 48 is a camber line 50. The camber line 50 extends over substantially the whole length of the aerofoil section 48 from the leading edge 40 to the trailing edge 42 but stops short of both the leading and trailing edges 40, 42 to avoid flow effects at these locations impacting the recambering method. This also prevents the leading and trailing edges 40, 42 from being reshaped by the recambering method. Thus the upstream end 49 of the camber line 50 is spaced from the leading edge 40 and the downstream end 51 of the camber line 50 is spaced from the trailing edge 42. The camber line 50 is discretised into a plurality of camber points 52 such that the curved camber line 50 is approximated by straight intermediate line portions 54 between camber points 52.

Figure 4:
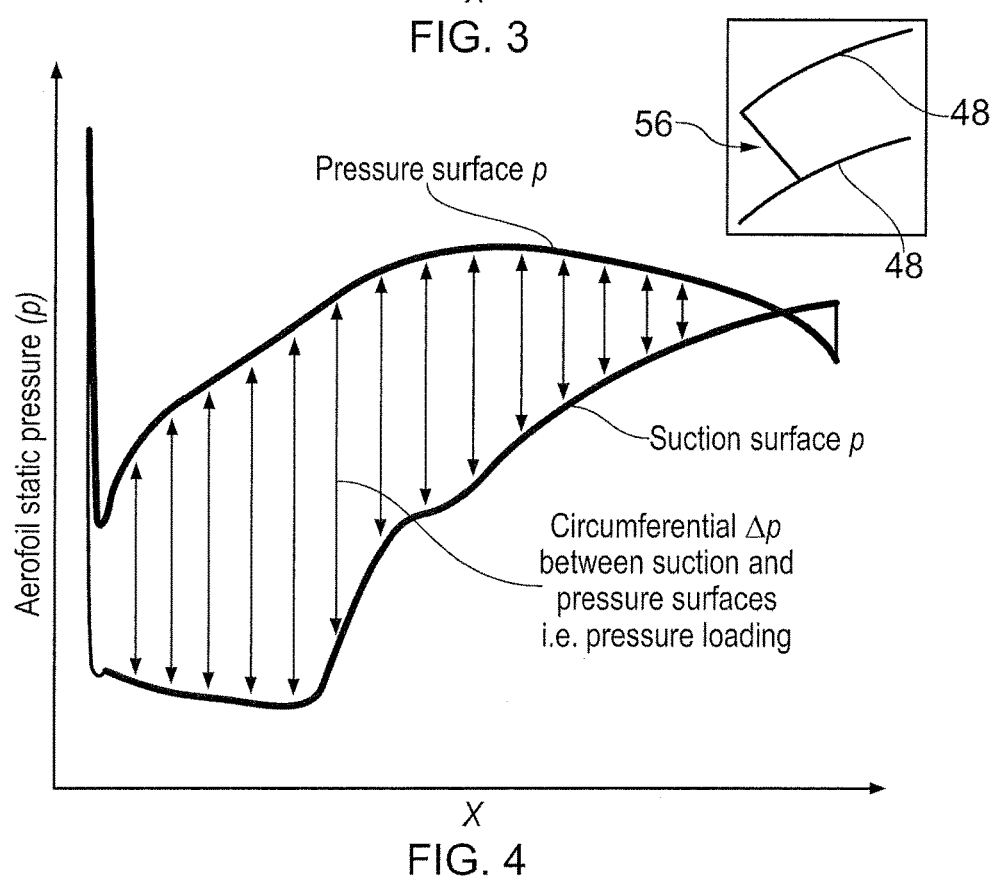
FIG. 4 is a plot of static pressure against axial position.

The static pressure P can be determined on the pressure and suction surfaces 44, 46 circumferentially aligned with the camber points 52. A plot of static pressure P against axial distance x is shown in FIG. 4. The vertical distance between the pressure surface pressure line and the suction surface pressure line is the pressure loading; that is, the circumferential difference in pressure across the aerofoil section 48. The static pressure P plotted in FIG. 4 is representative of aerofoils 36 experiencing passage shock 56 aligned with the leading edge 40 of the circumferentially advanced one of the pair of aerofoils 36 defining the passage. Where the passage shock 56 is differently aligned, or the aerofoils 36 have differently shaped camber lines 50, the shape of the static pressure plot is different.

Figure 5:
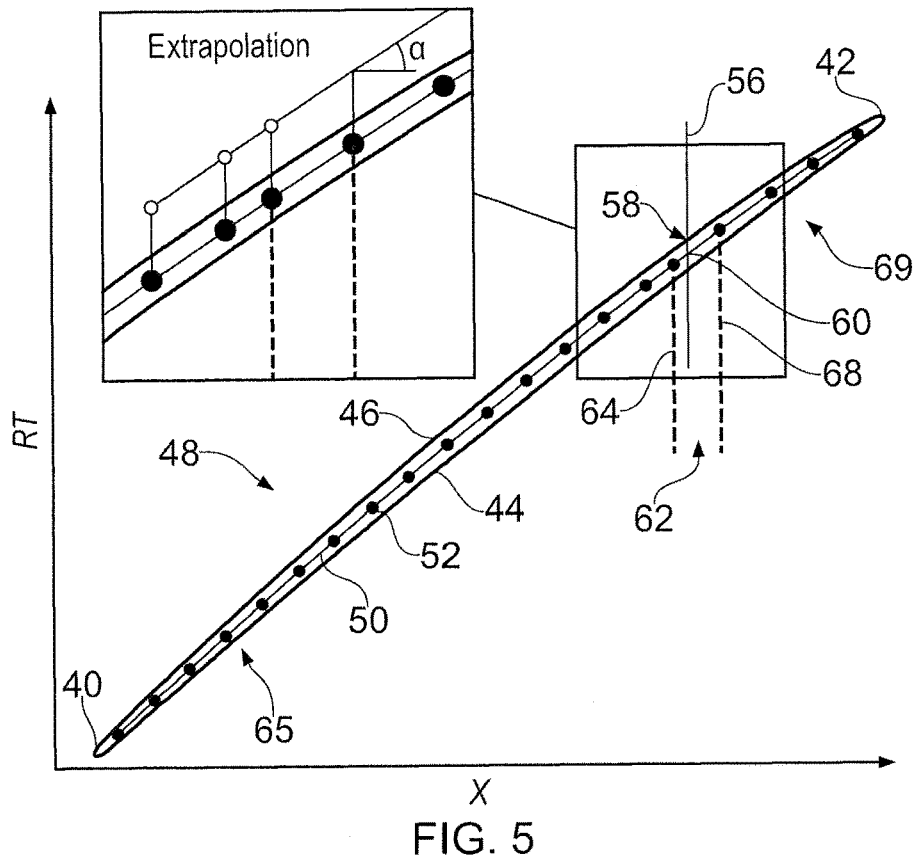
FIG. 5 is an aerofoil section showing features of the method according to the present invention.

FIG. 5 shows the aerofoil section 48 with features of the method of the present invention. In a first step of the method, an intersection point 58 is determined where the passage shock 56 intersects the suction surface 46 of the aerofoil section 48. In a second step of the method the intersection point 58 is projected in the circumferential direction onto the camber line 50 to give a shock position 60. Alternatively the intersection point 58 may be projected onto the camber line 50 in a direction which is normal to the camber line 50.

In a third step of the method a shock region 62 is defined. The shock region 62 encompasses the shock position 60 on the camber line 50 and extends in a chordal direction towards the leading and trailing edges 40, 42. For example, the shock region 62 may extend by 2-5%, preferably around 3%, of chord length towards each of the leading and trailing edges 40, 42. Alternatively it may extend by more than 3% of chord length, by less than 3% of chord length, or by a different fraction of chord length towards the leading edge 40 than towards the trailing edge 42 so that the shock region 62 is asymmetric about the shock position 60. The shock region 62 must have sufficient chordal or axial extent that the pressure loading discontinuity caused by the passage shock 56 is fully contained within the shock region 62. Computational fluid dynamic modelling spreads the passage shock 56 so that it has a greater modelled chordal extent than actual chordal extent.

Figure 6:
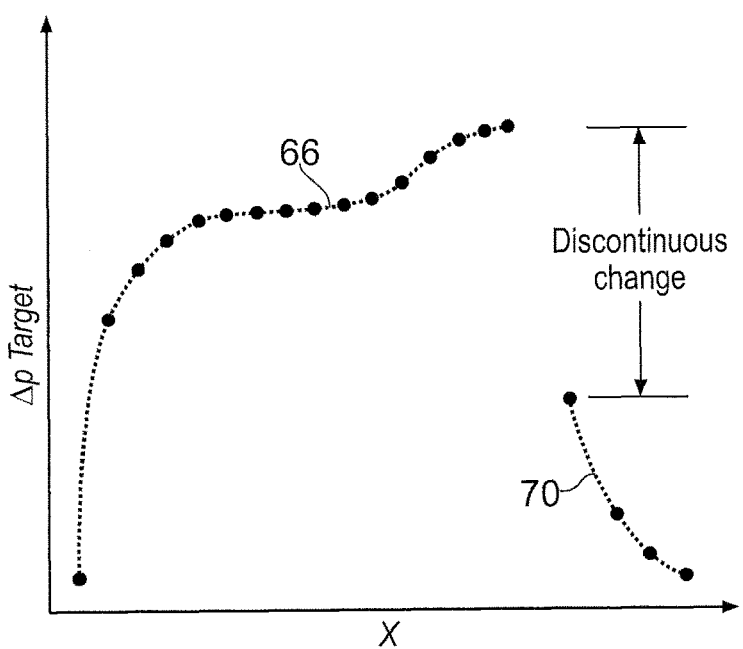
FIG. 6 is an exemplary plot of target pressure distribution for use in the method according to the present invention.

In a fourth step of the method the position of each of the camber points 52 between the upstream edge 64 of the shock region 62 and the upstream end 49 of the camber line 50, an upstream region 65, is recalculated. Preferably the recalculation is performed using the semi-inverse design method to match a calculated pressure loading between the pressure and suction surfaces 44, 46, circumferentially aligned with each camber point 52, with a target pressure loading distribution. An exemplary target pressure distribution 66 for the upstream region 65 of the aerofoil section 48 is shown in FIG. 6. First the camber angle a between each intermediate line portion 54 and the axial direction is calculated. The recalculation may then be performed by calculating a recamber angle $\Delta\alpha$, which is the change to the camber angle $\alpha$ to match a desired pressure loading distribution. The recamber angle Δα is proportional to the difference between calculated and target pressure loading and inversely proportional to the sum of the static pressure at the pressure surface 44 and the static pressure at the suction surface 46, circumferentially aligned with each camber point 52. Mathematically, $$\Delta \alpha = K \frac{\Delta P_{calc} - \Delta P_{target}}{P_{PS} + P_{SS}},$$

where K is a stiffness constant for the aerofoil 36. The recalculation of the upstream region 65 in the fourth step may be performed from the shock region 62 to the upstream end 49 of the camber line 50 or in the opposite direction.

At the end of the fourth step of the method an updated position for each camber point 52 has been calculated and an updated camber angle a calculated (from the previous camber angle a and the recamber angle Δα) to define the direction of each intermediate line portion 54 for the upstream region 65.

In a fifth step of the method the camber line 50 is extrapolated across the shock region 62. The position of the camber line 50 at the upstream edge 64 of the shock region 62 and the camber angle a of the intermediate line portion 54 that meets the upstream edge 64 of the shock region 62 are used as the basis of the extrapolation. A geometric criterion is then applied to extrapolate or project the camber line 50 across the shock region 62. The geometric criterion may be that the camber line 50 is linear, in which case the camber angle α at the downstream edge 68 of the shock region 62 is the same as at the upstream edge 64. Alternatively the geometric criterion may be that the camber line 50 matches a quadratic curve, a polynomial curve, an exponential curve, conic section (i.e. fitting to part of a circle or ellipse), B-spline, or some other geometric shape defined by an analytic function or in any other way. The geometric criterion may use more than one camber point 52 from the upstream portion to extrapolate or project the camber line 50 across the shock region 62.

In the sixth step of the method of the present invention the position of each of the camber points 52 between the downstream edge 68 of the shock region 62 and the downstream end 51 of the camber line 50, a downstream region 69, is recalculated. Preferably the recalculation is performed in the same manner as fourth step of the method, that is using the semi-inverse design method to match a calculated pressure loading between the pressure and suction surfaces 44, 46, circumferentially aligned with each camber point 52, with a target pressure loading distribution. An exemplary target pressure loading distribution 70 for the downstream region 69 of the aerofoil section 48 is shown in FIG. 6. The recalculating of the downstream region 69 in the sixth step may be performed from the downstream edge 68 of the shock region 62 to the downstream end 51 of the camber line 50 or in the opposite direction.

First the camber angle αat the downstream edge 68 of the shock region 62 is determined. The pressure loading at the downstream edge 68 of the shock region 62 is calculated from the determined camber angle α. The target downstream pressure loading distribution 70 is then scaled on the basis of the calculated pressure loading at the downstream edge 68 of the shock region 62. The recalculation may then be performed for successive camber points 52 by calculating a recamber angle Δα, which is the change to the camber angle α to match the target pressure loading distribution 70.

Advantageously, the target pressure loading distribution 70 for the downstream region 69 of the aerofoil section 48 is different to the target pressure loading distribution 66 for the upstream region 65 of the aerofoil section 48. This can be clearly seen in FIG. 6.

Preferably there is a further step in the present invention in which the new position of the suction surface 46 and the pressure surface 44 is determined from the recalculated camber line 50 and the thickness constraint.

Advantageously the steps of the method are iterated using the recalculated suction surface 46, pressure surface 44 and camber line 50. The method thus determines the new intersection point 58 between the passage shock 56 and the suction surface 46, projects this to a new shock position 60 on the camber line 50 and defines a new shock region 62 encompassing this new shock position 60. Then the method recalculates the position of each camber point 52 in the upstream region 65. This portion of the aerofoil section 48 may be a different chordal length than in the previous iteration because the passage shock 56 intersects the suction surface 46 at a different axial position. The camber line 50 is projected across the shock region 62 and then the position of each camber point 52 in the downstream region 69 is recalculated.

Depending on the position of the intersection point 58, the proportion of each target pressure loading distribution 66, 70 used may change. For example, a truncated length of the target pressure loading distribution 66 may be used where the passage shock 56 acts nearer to the leading edge 40 and more of the target pressure loading distribution 70 be used where the passage shock 56 acts further from the leading edge 40. Alternatively, the same proportion of each target pressure loading distribution 66, 70 may be used wherever the intersection point 58 lies and be stretched or compressed to fill the required axial length of the upstream or downstream region 65, 69.

The steps of the method are iterated until the calculated pressure loading at each camber point 52 matches the target pressure loading distribution 66, 70 to within a pre-defined tolerance. Alternatively the steps of the method may be iterated until the intersection point 58 in one iteration is at the same position as in the previous iteration, or until another criterion is met. The iteration may also cease after a predetermined number of iterations.

Preferably the method is iterated for each aerofoil section 48 in the array forming the aerofoil 36. The result is then a recambered aerofoil design. The method may comprise a further step to manufacture an aerofoil 36 to the recambered aerofoil design.

Figure 7:
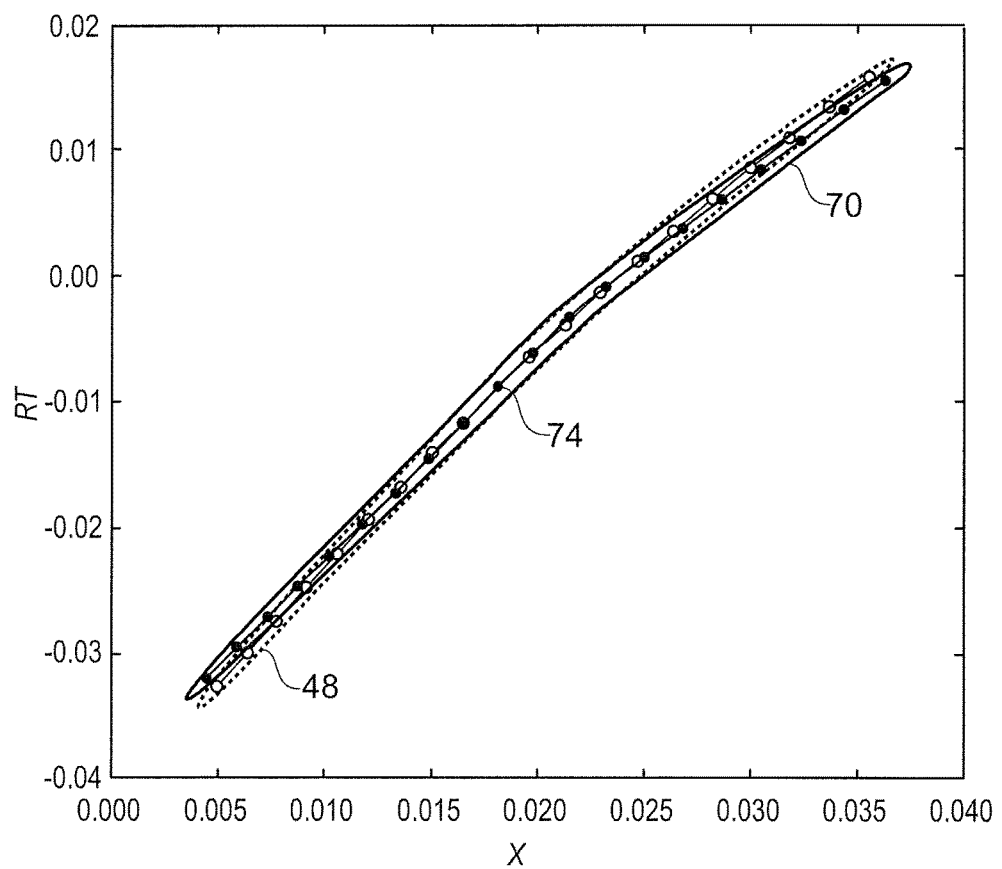
FIG. 7 shows an initial aerofoil section and an aerofoil section recambered according to the method of the present invention.

FIG. 7 shows the initial aerofoil section 48 and the recambered aerofoil section 72. As can be seen, the pressure surface 44 and suction surface 46 of the recambered aerofoil section 72 are smooth, having no kink or other discontinuity as generated by known methods of recambering aerofoils 36.

The method of the present invention should preferably be refined to set a camber point 52 on the stacking axis 38. There should then be a criterion applied so that the stacking axis camber point 74 cannot be displaced during the recalculation of the camber line 50. This guarantees that the array of aerofoil sections 48 will form a continuous, three-dimensional, aerofoil 36 after application of the method. It can be seen in FIG. 7 that the stacking axis camber point 74 is unchanged between the initial aerofoil section 48 and the recambered aerofoil section 72.

The method of the present invention is preferably encompassed in computer-implemented code and stored on a computer-readable medium. It is thus a computer-implemented method of recambering an aerofoil section. The method may be implemented on a basic computer system comprising a processing unit, memory, user interface means such as a keyboard and/or mouse, and display means. The method is a design method which is performed 'offline' starting from a previous aerofoil design.

Although the first step of the method has been described as determining the intersection point 58 on the suction surface 46, the method is also applicable where the intersection point 76 (not shown) between the passage shock 56 and the pressure surface 44 is found. It is generally more beneficial to use the method to determine the intersection point 58 on the suction surface 46 because the passage shock 56 just touches the leading edge 40 of the aerofoil 36 on the pressure surface 44 and so the problems of discontinuities in the pressure loading are small or non-existent. However, in some applications the passage shock 56 may intersect with the pressure surface 44 away from the leading edge 40 of the aerofoil 36 and such discontinuities will be present.

The method can also be performed by finding the intersection point 58 on the suction surface 46 and the intersection point 76 on the pressure surface 44. Each of these is projected onto the camber line 50 to give shock positions 60. A shock region 62 encompassing each shock position 60 is then determined. The shock regions 62 may overlap, in which case they appear as one larger shock region 62 that may be asymmetric. Alternatively the shock regions 62 may be spaced apart, in which case there are three camber line regions: an upstream region 65, a downstream region 69 and an intermediate region 78 (not shown) between the two shock regions 62. The method then proceeds to recalculate the camber line 50 in the upstream region 65, project the camber line 50 across the first shock region 62, recalculate the camber line 50 in the intermediate region 78, project the camber line 50 across the second shock region 62 and finally recalculate the camber line 50 in the downstream region 69.

The method of the present invention is also applicable to other aerofoils that experience transonic flow, and therefore shocks. Such aerofoils comprise aircraft wings; propeller gas turbine engine blades; helicopter and aircraft propellers; gas turbine engines for aircraft, marine and industrial applications; compressor stages in turbochargers; radial flow impellers for gas pumping applications; and steam turbines for power generation applications.

The invention claimed is:

1. A method of recambering an aerofoil section wherein the aerofoil section is one of a spanwise array forming an aerofoil and wherein the aerofoil is one of a pair of adjacent aerofoils defining a passage; the aerofoil section having a leading edge, a trailing edge, a suction surface, a pressure surface, and a camber line, equidistant from the suction and pressure surfaces and having an upstream end and a downstream end; the method comprising steps to:
   a) determine a shock position on one of the pressure surface and the suction surface that intersects with a passage shock between the adjacent aerofoils;
   b) project the shock position onto the camber line;
   c) define a shock region encompassing the shock position and extending in a chordal direction towards the leading and trailing edges;
   d) recalculate, by applying a semi-inverse design method, the shock position of the camber line in an upstream region between the shock region and the upstream end of the camber line to match calculated pressure loading between the suction and pressure surfaces to a first target pressure loading distribution;
   e) project the camber line across the shock region to match a geometric criterion;
   f) recalculate, by applying the semi-inverse design method, the shock position of the camber line in a downstream region between the shock region and the downstream end of the camber line to match calculated pressure loading between the suction and pressure surfaces to a second target pressure loading distribution; and
   g) recamber the aerofoil section so that the camber line in said upstream region between the shock region and the upstream end of the camber line has the shock position recalculated in step d) and the camber line in the downstream region between the shock region and the downstream end of the camber line has the position recalculated in step f).

2. The method as claimed in claim 1 wherein the shock region extends by 2-5% of chordal length towards the leading edge and extends by 2-5% of chordal length towards the trailing edge.

3. The method as claimed in claim 1 wherein the camber line is discretised.

4. The method as claimed in claim 1 wherein the geometric criterion is one of the group comprising: linear; quadratic; polynomial; exponential; conic section fit; B-spline.

5. The method as claimed in claim 1 wherein the position of the camber line at the end of step 1e) is used to calculate a recamber angle ($\Delta\alpha$) for use in step 1f).

6. The method as claimed in claim 5 wherein the recamber angle ($\Delta\alpha$) is proportional to the difference between calculated and target pressure loading and inversely proportional to the sum of the pressures ($P_p$, $P_s$) on the pressure and suction surfaces.

7. The method as claimed in claim 1 further comprising a step before step 1f) to scale the second target pressure loading distribution using the calculated pressure loading at a downstream edge of the shock region.

8. The method as claimed in claim 1 wherein step 1a) comprises determining the position on each of the pressure and suction surfaces that intersects with the passage shock.

9. The method as claimed in claim 1 comprising applying computational fluid dynamics to calculate the calculated pressure loading.

10. The method as claimed in claim 1 further comprising a step to recalculate the position of the suction surface and the pressure surface from the recalculated camber line.

11. The method as claimed in claim 1 comprising iterating the steps of the method until the calculated pressure loading matches the target pressure loading within a predetermined tolerance.

12. The method as claimed in claim 1 comprising iterating the steps of the method for each aerofoil section in the array forming the aerofoil to produce a recambered aerofoil design.

13. The method as claimed in claim 12 further comprising a step to manufacture a recambered aerofoil according to the recambered aerofoil design.

14. A rotor assembly comprising a recambered aerofoil designed according to the method as claimed in claim 1.

15. A stator assembly comprising a recambered aerofoil designed according to the method as claimed in claim 1.

16. A gas turbine engine comprising a recambered aerofoil designed according to the method as claimed in claim 1.

* * * * *